(12) United States Patent
Kim (10) Patent No.: US 9,575,888 B2
(45) Date of Patent: Feb. 21, 2017

(54) SEMICONDUCTOR SYSTEM AND OPERATING METHOD THEREOF

(71) Applicant: SK hynix Inc., Gyeonggi-do (KR)

(72) Inventor: Eui Jin Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 86 days.

(21) Appl. No.: 14/199,739

(22) Filed: Mar. 6, 2014

(65) Prior Publication Data

US 2015/0121026 A1    Apr. 30, 2015

(30) Foreign Application Priority Data

Oct. 28, 2013    (KR) .................. 10-2013-0128491

(51) Int. Cl.
  *G06F 12/00*    (2006.01)
  *G06F 12/02*    (2006.01)
(52) U.S. Cl.
  CPC ..... *G06F 12/0253* (2013.01); *G06F 2212/702* (2013.01)

(58) Field of Classification Search
  None
  See application file for complete search history.

(56) References Cited

U.S. PATENT DOCUMENTS

| 2011/0055625 | A1 | 3/2011 | Honda |
| 2012/0079173 | A1* | 3/2012 | Chae ................... G06F 12/0246 711/103 |
| 2012/0311293 | A1* | 12/2012 | Nemazie et al. ............. 711/171 |

FOREIGN PATENT DOCUMENTS

KR    1020090129791    12/2009

* cited by examiner

*Primary Examiner* — Baboucarr Faal
(74) *Attorney, Agent, or Firm* — IP & T Group LLP (57) ABSTRACT

A semiconductor system includes a semiconductor memory device suitable for storing data, and a host suitable for controlling the semiconductor memory device in response to an external command signal, in which the semiconductor memory device includes a buffer block suitable for storing first data programmed under control of the host, and a main block suitable for storing the second data programmed under control of the host or a copy of the first data stored in the buffer block at a sudden power fail.

12 Claims, 5 Drawing Sheets

SEMICONDUCTOR SYSTEM AND OPERATING METHOD THEREOF

CROSS-REFERENCE TO RELATED APPLICATION

The present application claims priority of Korean patent application number 10-2013-0128491, filed on Oct. 28, 2013, in the Korean Intellectual Property Office, the entire disclosure of which is incorporated herein by reference in its entirety.

BACKGROUND

Field of Invention

Various embodiments of the present invention relate to a semiconductor system and an operating method thereof, and more particularly, to a semiconductor system for restoring data when a sudden power fail is caused and an operating method thereof.

Description of Related Art

A semiconductor system includes a semiconductor memory device configured to store data, and a host configured to control the semiconductor memory device. The host transfers command signals, and addresses for program, read, and erase operations to the semiconductor memory device, and the semiconductor memory device performs the program, read, and erase operations in response to the command signals and the addresses received from the host. Accordingly, the host needs to have high reliability for control of the semiconductor memory device until a started operation is completed, and the semiconductor memory device needs to have high reliability for storage of data.

In the meantime, a sudden power fail may be caused during the operation of the semiconductor system. The sudden power fail means a phenomenon in which the supply of power is unexpectedly stopped. For example, an unexpected power supply stopping phenomenon, such as blackout, may be considered as the sudden power fail.

When the sudden power fail is repaired, the host needs to resume the operation, which was being performed, and the semiconductor memory device needs to wholly store programmed data and restore the data.

BRIEF SUMMARY

The present invention has been made in an effort to provide a semiconductor system capable of, when a sudden power fail is caused, restoring data, which is programmed in a semiconductor memory device before the sudden power fail, in a reduced time without increasing the area of a device for restoring the data, and an operating method thereof.

An exemplary embodiment of the present invention provides a semiconductor system, including a semiconductor memory device suitable for storing data, and a host suitable for controlling the semiconductor memory device in response to an external command signal, wherein the semiconductor memory device includes a buffer block suitable for storing first data programmed under control of the host, and a main block suitable for storing the second data programmed under control of the host or a copy of the first data stored in the buffer block at a sudden power fail.

Another exemplary embodiment of the present invention provides a method of operating a semiconductor system, including programming first bits of data in a buffer block, copying the first bits of the data stored in the buffer block to a main block, and programming second bits of the data in the main block, wherein when a sudden power fail is caused in the programming of the second bits of the data, the first bits of the data stored in the buffer block is copied to the main block, and then the programming of the second bits of the data is performed again.

Yet another exemplary embodiment of the present invention provides a method of operating a semiconductor system, including programming first bits of data in a buffer block, determining whether to perform a garbage collection of the buffer block, when the first bits of data is erase data, programming second bits of the data in the buffer block, and then the second bits of the data programmed in the buffer block to a main block when it is determined not to perform the garbage collection as a result of the determining and performing the garbage collection, and then programming the second bits of the data in the main block when it is determined to perform the garbage collection as a result of the determining, wherein when a sudden power fail is caused in the programming of the second bits of the data, the first bits of the data stored in the buffer block is copied to the main block, and then the second bits of the data is programmed again.

According to the embodiments of the present invention, when a sudden power fail is caused, it is possible to easily restore data which is program-completed before the sudden power fail, and decrease a program operation time without increasing the area of a device for restoring the data. Accordingly, it is possible to suppress a decrease in a capacity of a semiconductor system and improve reliability.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which.

DETAILED DESCRIPTION

Hereinafter, an embodiment of the present invention will be described with reference to the accompanying drawings in detail. However, the present invention is not limited to an embodiment disclosed below and may be implemented in various forms and the scope of the present invention is not limited to the following embodiments. Rather, the embodiment is provided to more sincerely and fully disclose the present invention and to completely transfer the spirit of the present invention to those skilled in the art to which the present invention pertains, and the scope of the present invention should be understood by the claims of the present invention.

Figure 1:
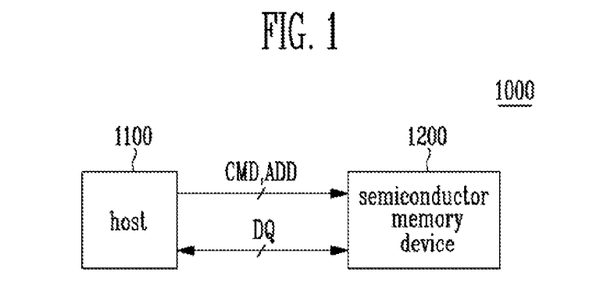
FIG. 1 is a block diagram illustrating a semiconductor system according to an embodiment of the present invention.

FIG. 1 is a block diagram illustrating a semiconductor system according to an embodiment of the present invention.

Referring to FIG. 1, the semiconductor system 1000 includes a host 1100 and a semiconductor memory device 1200. The host 1100 outputs operation command signals CMD, addresses ADD, and data DQ for controlling the semiconductor memory device 1200 in response to an external command signal. The semiconductor memory device 1200 may perform a program operation, a read operation, or an erase operation in response to the operation command signals CMD, the addresses ADD, and the data DQ, and transfer the data output during the read operation to the host 1100.

There may be a case in which supply of power is unexpectedly stopped due to various reasons during the operation of the semiconductor system 1000. This refers to a sudden power fail.

When the sudden power fail is caused, the semiconductor memory device 1200 is configured to maintain data stored before the sudden power fail, and restore the data for a next operation. The semiconductor memory device 1200 will be described in detail below.

Figure 2:
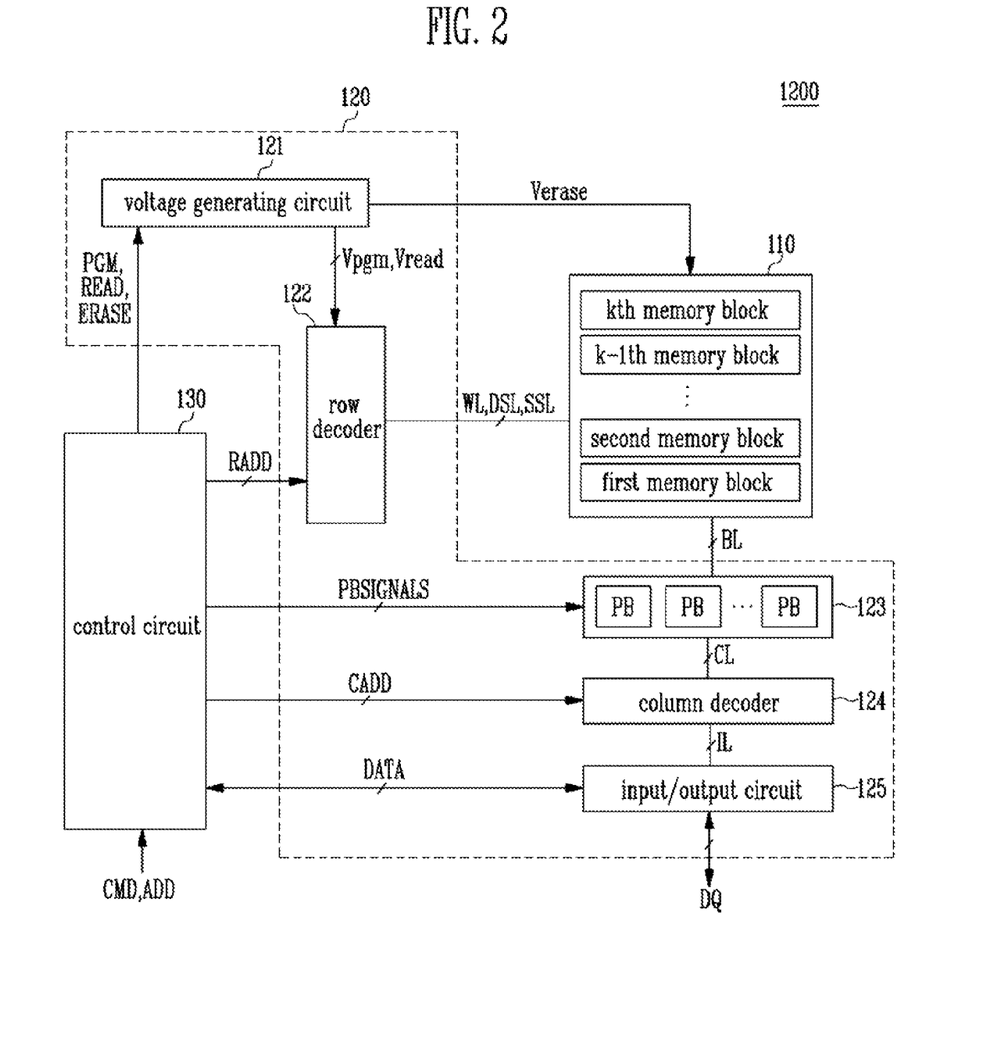
FIG. 2 is a block diagram illustrating a semiconductor memory device according to the embodiment of the present invention.

FIG. 2 is a block diagram illustrating the semiconductor memory device according to the embodiment of the present invention.

Referring to FIG. 2, the semiconductor memory device 1200 includes a memory cell array 110 configured to store data, peripheral circuits 120 configured to perform the program, read, and erase operations, and a control circuit 130 configured to control the peripheral circuits 120.

The memory cell array 110 includes first to $k^{th}$ memory blocks, and the first to $k^{th}$ memory blocks include a plurality of memory cells for storing data.

The peripheral circuits 120 include a voltage generating circuit 121, a row decoder 122, a page buffer group 123, a column decoder 124, and an input/output circuit 125.

The voltage generating circuit 121 generates voltages necessary for various operations, such as a program voltage Vpgm, a read voltage Vread, and an erase voltage Verase, in response to a program signal PGM, a read signal READ, or an erase signal ERASE. For example, the voltage generating circuit 121 generates the program voltage Vpgm and the read voltage Vread and supplies the generated program voltage Vpgm and read voltage Vread to the row decoder 122, and generates the erase voltage Verase and supplies the generated erase voltage Verase to the memory cell array 110.

The row decoder 122 selects one among the first to $k^{th}$ memory blocks in response to a row address RADD, and transmits the voltages generated in the voltage generating circuit 121 to word lines WL, a drain select line DSL, and a source select line SSL connected to the selected memory block.

The page buffer group 123 includes a plurality of page buffers PB configured to temporarily store data in response to page buffer control signals PBSIGNALS. The page buffers PB are connected to the memory cell array 110 through bit lines BL, and transfer the temporarily stored data to the bit lines BL in response to the page buffer control signals PBSIGNALS, or temporarily stores the data transferred from the memory cell array 110 through the bit lines BL.

The column decoder 124 is connected to the page buffers PB through column lines CL, and transfers data to the page buffers PB in response to a column address CADD or receives data from the page buffers PB.

The input/output circuit 125 is connected to the column decoder 124 through input/output lines IL, and transfers input/output data DQ to the column decoder 124 in response to a data signal DATA or outputs the input/output data DQ received from the column decoder 124 to the outside.

The control circuit 130 outputs the operation signal PGM, READ, or ERASE, the row address RADD, the page buffer signals PBSIGNALS, the column address CADD, and the data signal DATA in response to the command signal CMD and the address ADD.

Figure 3:
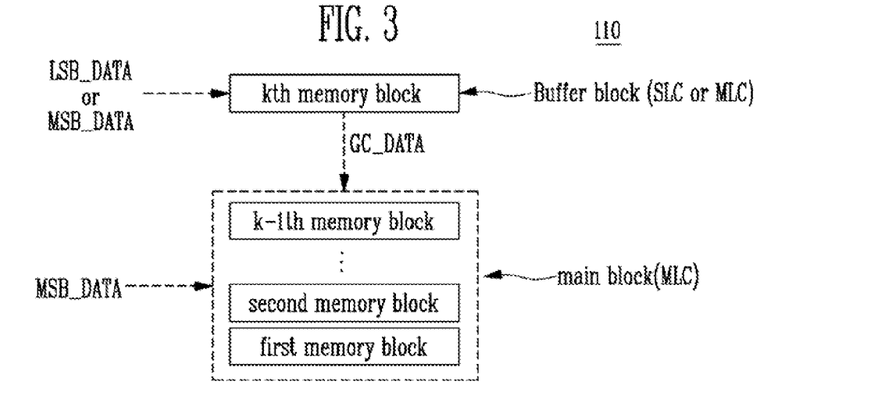
FIG. 3 is a diagram particularly illustrating a memory cell array according to the embodiment of the present invention.

FIG. 3 is a diagram particularly illustrating the memory cell array according to the embodiment of the present invention.

Referring to FIG. 3, the memory cell array 110 includes the first to $k^{th}$ memory blocks. Some memory blocks among the first to $k^{th}$ memory blocks are designated as a buffer block, and the remaining memory blocks are designated as a main block. The buffer block stores original data received from the host during the program operation, and the main block stores the original data received from the host or a copy of the original data stored in the buffer block. That is, final data of the program operation is stored in the main block. Accordingly, most of the first to $k^{th}$ memory blocks are designated as the main block. For example, the first to $k-1^{th}$ memory blocks may be designated as the main block, and the $k^{th}$ memory block may be designated as the buffer block.

The main block needs to store massive data, so that the main block is implemented with Multi Level Cells (MLCs). The buffer block may be implemented with the MLCs or Single Level Cells (SLCs), but the original data needs to be wholly stored, so that the buffer block is implemented with the SLCs having higher reliability than that of the MLCs.

When the main block is implemented with the MLCs, the data is divided into least significant bit data LSB_DATA and most significant bit data MSB_DATA. For example, the host controls the semiconductor memory device to first program the least significant bit data LSB_DATA and then program the most significant bit data MSB_DATA. The least significant bit data LSB_DATA is preferentially stored in the buffer block, and the least significant bit data LSB_DATA stored in the buffer block is copied to the main block during the program operation of the most significant bit data MSB_DATA. When a storage space is left in the buffer block, the most significant bit data MSB_DATA is stored in the buffer block, and when a storage space is not left in the buffer block, the most significant bit data MSB_DATA is stored in the main block. That is, the memory cells in which the most significant bit data MSB_DATA is programmed are interfered less than memory cells in which the least significant bit data LSB_DATA is programmed. Therefore, significance of original data of the most significant bit data may be lower than that of the least significant bit data LSB_DATA. Accordingly, only in a case where the storage space is left in the buffer block after the least significant bit data LSB_DATA is stored, the most significant bit data MSB_DATA is stored as the original data. When the storage space is not left in the buffer block, an operation of moving valid data among the data stored in the buffer block to the main block is performed, which is referred to as a garbage collection. Hereinafter, for the clearer description, the valid data moving from the buffer block to the main block through the garbage collection is defined as garbage data GC_DATA.

A configuration of the memory block will be described in detail below.

Figure 4:
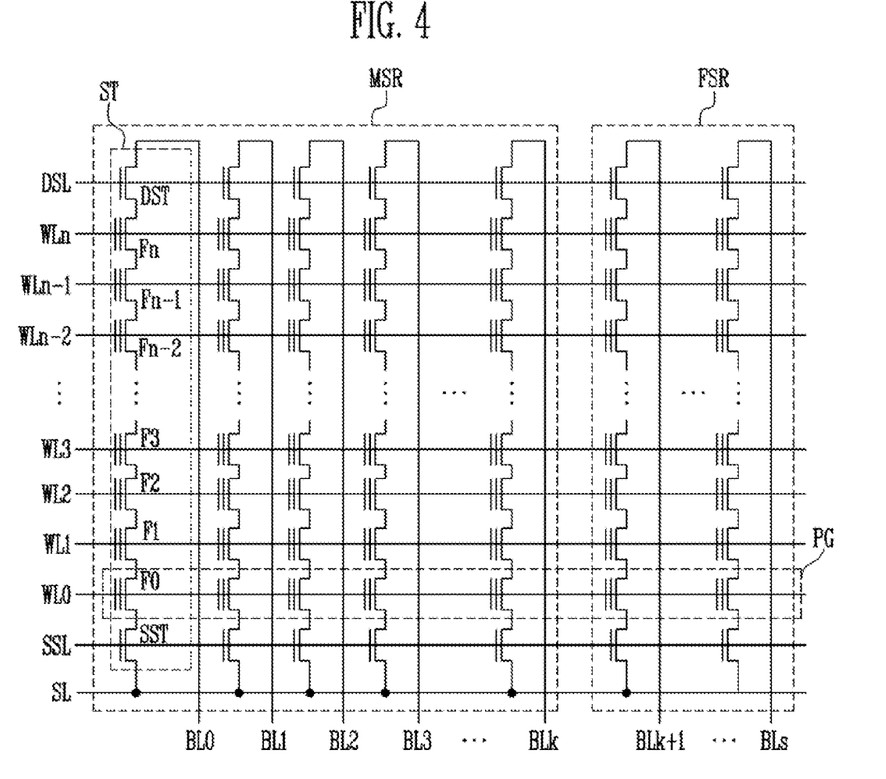
FIG. 4 is a diagram particularly illustrating a memory block according to the embodiment of the present invention.

FIG. 4 is a diagram particularly illustrating the memory block according to the embodiment of the present invention.

Referring to FIG. 4, the memory blocks may be configured in the same structure, so that any one memory block will be described as an example.

The memory block includes a main string region MSR configured to store main data, and a flag string region FSR configured to store flag data. The main string region MSR and the flag string region FSR includes a plurality of strings ST which are equally configured to each other.

The string ST includes a drain select transistor DST, a plurality of memory cells F0 to Fn, and a source select transistor SST, which are in series connected to each other. Drains of the drain select transistors DST included in the respective strings ST are connected to bit lines BL0 to BLs, and sources of the source select transistors SST included in the respective strings ST are connected to a source line SL in common. The $0^{th}$ to $k^{th}$ bit lines BL0 to BLk are connected to the main string region MSR, and the $k+1^{th}$ to $s^{th}$ bit lines BLk+1 to BLs are connected to the flag string region FSR. Gates of the drain select transistors DST included in the respective strings ST are connected to the drain select line DSL, gates of the memory cells F0 to Fn included in each string ST are connected to the word lines WL0 to WLn, and gates of the source select transistors SST included in the respective strings ST are connected to the source select line SSL.

A group of memory cells connected to one word line is referred to as a page PG, so that when n+1 word lines are connected to the memory block, n+1 pages PG are included in one memory block. When a least significant bit program operation of the selected page is completed during the program operation, data indicating that the least significant bit program operation is completed is stored in the flag string region FSR of the selected page. Accordingly, it is possible to determine whether the least significant bit program operation of the page is completed based on the data stored in the flag string region FSR of the page.

Figure 5:
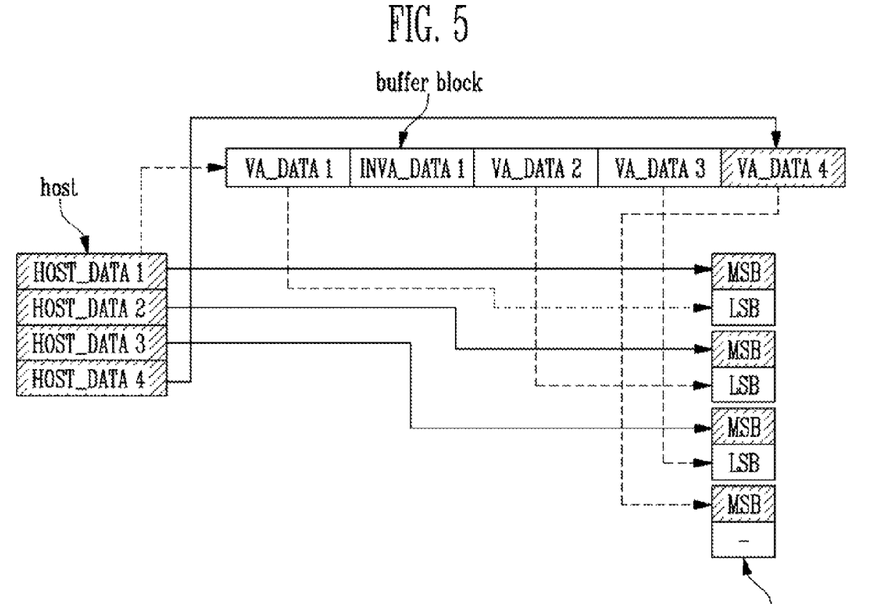
FIG. 5 is a diagram schematically illustrating a data storing method according to the embodiment of the present invention.

FIG. 5 is a diagram schematically illustrating a data storing method according to the embodiment of the present invention.

Referring to FIG. 5, when the program operation is started, the host stores data VA_DATA1, VA_DATA2, and VA_DATA3 corresponding to least significant bit data in the buffer block. In this case, the least significant bit data LSB_DATA stored in the buffer block is the original data. When valid data VA_DATA1, VA_DATA2, and VA_DATA3 corresponding to the least significant bit data among the data VA_DATA1, INVA_DATA1, VA_DATA2, and VA_DATA3 stored in the buffer block is completely stored, the host stores data HOST_DATA1, HOST_DATA2, and HOST_DATA3 corresponding to most significant bit data in the main block. In this case, after the data VA_DATA1, VA_DATA2, and VA_DATA3 stored in the buffer block is first copied to the main block, the data HOST_DATA1, HOST_DATA2, and HOST_DATA3 corresponding to the most significant bit data is stored in the main block. The data VA_DATA1, VA_DATA2, and VA_DATA3 copied from the buffer block to the main block is stored in a least significant bit LSB page in the selected page PG of the main block, and the data HOST_DATA1, HOST_DATA2, and HOST_ DATA3 corresponding to the most significant bit data is stored in a most significant bit MSB page in the selected page PG. The data VA_DATA1, VA_DATA2 and VA_DATA3 is not copied to the main block, when the data VA_DATA1, VA_DATA2, and VA_DATA3 corresponding to the least significant bit data is erase data. In this case, when a storage space is left in the buffer block, the data VA_DATA4 corresponding to the most significant bit data is stored in the left storage space, and then the stored data VA_DATA4 is copied to the most significant bit MSB page of the selected page PG of the main block again.

During the program operation of the data stored in the buffer block, the data VA_DATA1, VA_DATA2, VA_DATA3 and VA_DATA4 stored in the buffer block is the original data. When an error is caused during the copy of the corresponding data to the main block, the corresponding data may be restored by using the original data.

Figure 6:
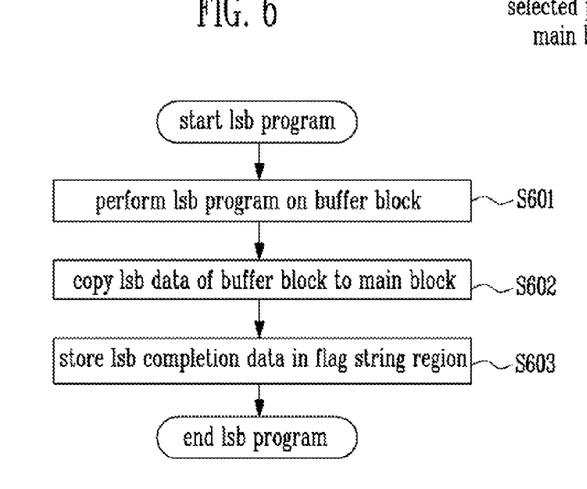
FIG. 6 is a diagram illustrating an LSB program method according to the embodiment of the present invention.

FIG. 6 is a diagram illustrating an LSB program method according to the embodiment of the present invention.

Referring to FIG. 6, when the LSB program operation is started, the control circuit performs the LSB program operation for storing LSB_DATA in the buffer block in response to an operation command signal CMD and an address ADD transmitted from the host. In a case where the sudden power fail is caused before the completion of the program of the LSB_DATA in the buffer block, the sudden power fail is caused during the program operation by the host, so that the semiconductor memory device serving to store data has no responsibility. When the sudden power fail is caused after the completion of the LSB program, the semiconductor memory device serving to store data is responsible for the sudden power fail, so that the original data is stored in the buffer block implemented with the SLCs, instead of the main block implemented with the MLCs. When the original data is stored in the main block, the original data may be damaged when the error, such as the sudden power fail, is caused, so that the original data is stored in the buffer block implemented with the SLCs having better reliability than that of the MLCs.

Next, the LSB_DATA stored in the buffer block is copied to the main block (S602). In this case, the LSB_DATA is copied to selected memory cells of a selected page included in the main string region of the main block, and the selected memory cells and information about the original LSB_ DATA stored in the buffer block are mapped to each other. For example, when the original LSB_DATA stored in a first storage place of the buffer block is copied to a fourth memory cell of the second page of a main block, corresponding address information is stored in another storage place to recognize that original data of the data stored in the fourth memory cell of the second page is stored in the first storage place of the buffer block later.

When the LSB_DATA, which is the original data stored in the buffer block, is copied to the selected page of the main block, LSB completion data representing that LSB copying is completed is stored in the flag string region (S603), and the LSB program operation is ended.

Figure 7:
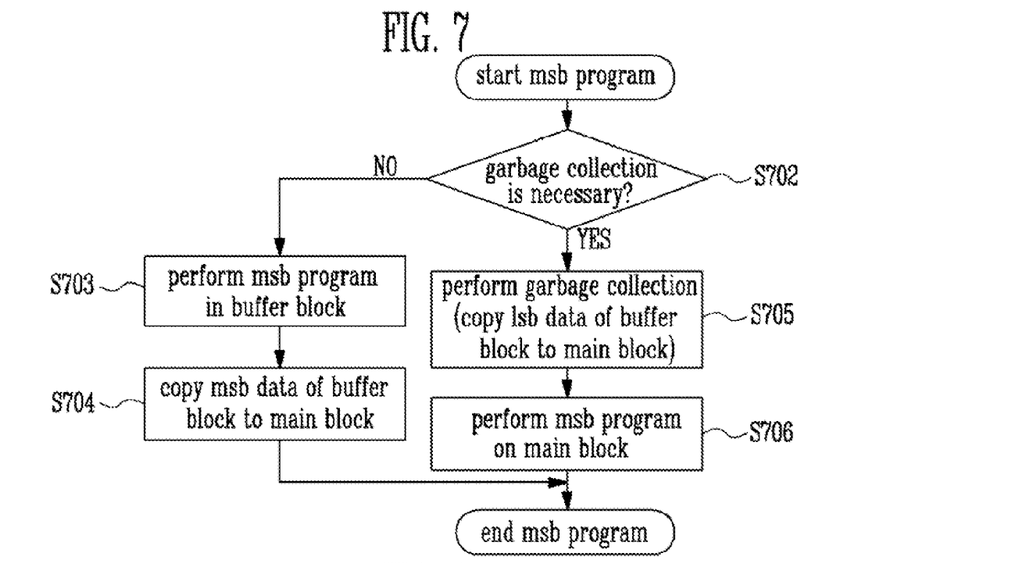
FIG. 7 is a flowchart illustrating an MSB program method according to the embodiment of the present invention.

FIG. 7 is a flowchart illustrating an MSB program method according to the embodiment of the present invention.

Referring to FIG. 7, when the MSB program operation is started, whether it is necessary to perform the garbage collection is determined (S702). The garbage collection means an operation of copying valid data among data stored in the buffer block to another storage place when data is stored in all of the storage places of the buffer block.

As a result of step S702, when it is determined that it is not necessary to perform the garbage collection, the MSB program operation for storing MSB_DATA in the buffer block is performed (S703). The MSB_DATA stored in the buffer block is original data. In a case where the sudden power fail is caused before the completion of the program of the MSB_DATA in the buffer block, the sudden power fail is caused during the program operation by the host, so that the semiconductor memory device serving to store data has no responsibility. When the sudden power fail is caused after the completion of the MSB program, the semiconductor memory device serving to store data is responsible for the sudden power fail, so that the original data is stored in the buffer block implemented with the SLCs, instead of the main block implemented with the MLCs. When the original data is stored in the main block, the original data may be damaged when the error, such as the sudden power fail is caused, so that the original data is stored in the buffer block implemented with the SLCs having better reliability than that of the MLCs.

Next, the MSB_DATA stored in the buffer block is copied to the main block. Accordingly, the MSB_DATA is stored in the main block, and the original data of the MSB_DATA is stored in the buffer block. When the MSB_DATA, which is the original data stored in the buffer block, is copied to the main block, the MSB program is ended.

As a result of the step S702, when it is determined that it is necessary to perform the garbage collection, the garbage collection is performed (S705). For example, the LSB_DATA mapped to the MSB program operation is copied from the buffer block to the main block. In this case, all of the LSB_DATA stored in the buffer block is not copied to the main block, but the LSB_DATA mapped to the MSB program operation is copied to the main block. That is, the LSB_DATA corresponding to the MSB_DATA to be programmed is copied to the main block.

Next, the MSB program operation for storing the MSB_DATA in the main block is performed (S705). The MSB_DATA is not programmed in the buffer block, but the MSB_DATA is programmed in the main block during the MSB program operation, so that it is possible to decrease a program operating time. When the program of the MSB_DATA is completed, the MSB program operation is ended.

Figure 8:
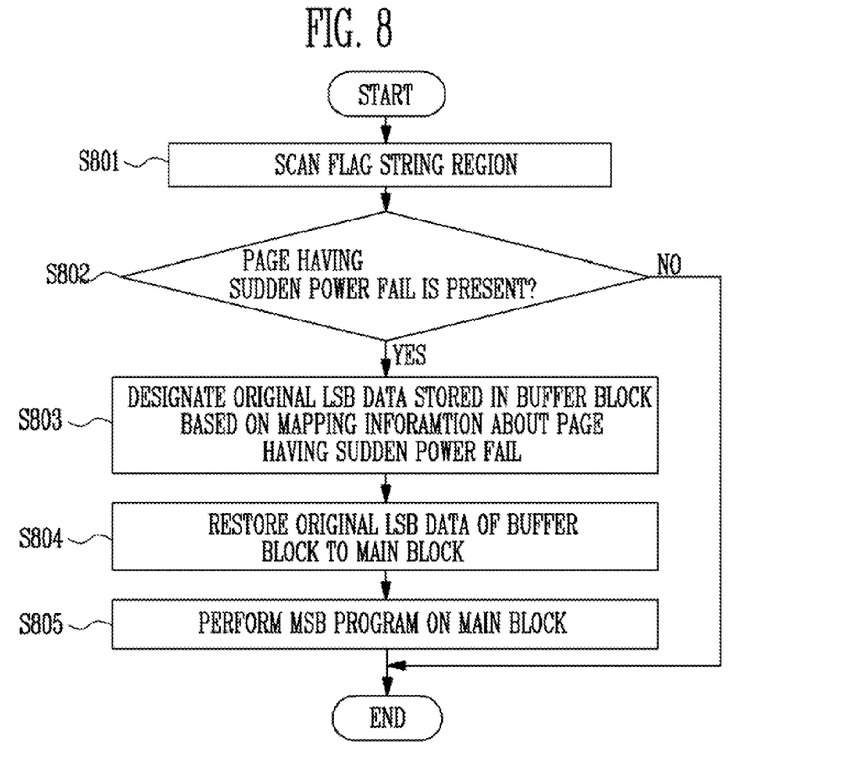
FIG. 8 is a flowchart illustrating a data restoring method according to the embodiment of the present invention.

FIG. 8 is a flowchart illustrating a data restoring method according to the embodiment of the present invention.

Referring to FIG. 8, in a case where the garbage collection is required during the MSB program operation, a data restoring process is performed depending on the sudden power fail. This will be described in detail below.

The flag string region of the main block is scanned (S801). The LSB completion data is stored in the flag string region, and a page in which the LSB completion data is not stored is scanned by scanning the flag string region.

Based on a result of the scan of step S801, it determined whether there is a page in which the sudden power fail is caused (S802). When it is determined that there is no page in which the sudden power fail is caused (S802), the data restoring process is ended since the sudden power fail is not caused.

As a result of the step S802, when it is determined that there is a page in which the sudden power fail is caused, the original LSB_DATA stored in the buffer block is designated based on mapping information about the page in which the sudden power fail is caused (S803).

The original LSB_DATA designated in the buffer block is restored to a selected page of the main block (S804). That is, even though the LSB_DATA is not stored in the main block, or the stored data is damaged, the original data is stored in the buffer block, so that the data is restorable to the main block.

Figure 9:
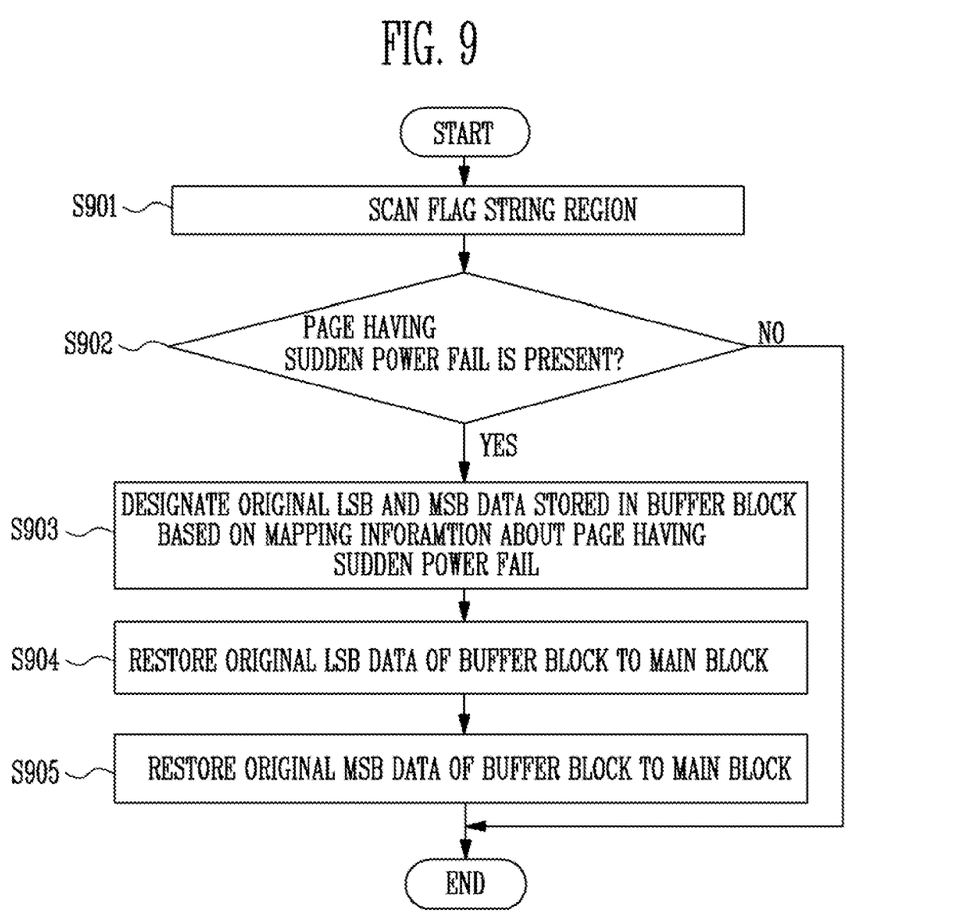
FIG. 9 is a flowchart illustrating a data restoring method according to another embodiment of the present invention.

FIG. 9 is a flowchart illustrating a data restoring method according to another embodiment of the present invention.

Referring to FIG. 9, in a case where the garbage collection is not required during the MSB program operation, a data restoring process is performed depending on the sudden power fail. This will be described in detail below.

The flag string region of the main block is scanned (S901). The LSB completion data is stored in the flag string region, and a page in which the LSB completion data is not stored is scanned by scanning the flag string region.

Based on a result of the step S901, it is determined whether there is a page in which the sudden power fail is caused (S802). When it is determined that there is no page in which the sudden power fail is caused (S902), the data restoring process is ended since the sudden power fail is not caused.

As a result of the step S902, when it is determined that there is a page in which the sudden power fail is caused, the original LSB and MSB_DATA stored in the buffer block is designated based on mapping information about the page in which the sudden power fail is caused (S903).

The original LSB_DATA designated in the buffer block is restored to a selected page of the main block (S904). That is, even though the LSB_DATA is not stored in the main block, or the stored data is damaged, the original data is stored in the buffer block, so that the data is restorable to the main block.

After the LSB_DATA is restored, the original MSB_DATA designated in the buffer block is restored to the selected page of the main block (S905).

As described above, the LSB_DATA is stored in the buffer block, and in a case where the storage space is not left in the buffer block, the MSB_DATA is not stored in the buffer block, but is stored in the main block, so that it is possible to decrease an area occupied by the buffer block. Further, since it is not necessary to store all of the MSB_DATA in the buffer block, it is possible to decrease the program operation time, and the original data of the LSB_DATA is stored in the buffer block, so that it, is possible to easily restore the LSB_DATA, which is easily damaged or deformed.

As described above, the embodiment has been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:
1. A semiconductor system, comprising:
a semiconductor memory device suitable for storing data; and
a host suitable for controlling the semiconductor memory device in response to an external command signal,
wherein the semiconductor memory device includes:
a buffer block suitable for storing least significant bits (LSB) data programmed under control of the host, wherein most significant bits (MSB) data are not stored in the buffer block; and
a main block suitable for:
storing the LSB data copied from the buffer block, directly storing the MSB data under control of the host after storing the LSB data copied from the buffer block, and storing the LSB data copied from the buffer block and the MSB data under control of the host at a sudden power fail.

2. The semiconductor system of claim 1, wherein the semiconductor memory device further includes:

peripheral circuits suitable for performing program, read, and erase operations on the buffer and main blocks; and a control circuit suitable for controlling the peripheral circuits under the control of the host.

3. The semiconductor system of claim 1, wherein the buffer block includes single level cells, and the main block includes multi level cells.

4. The semiconductor system of claim 1, wherein the main block includes a main string region and a flag string region.

5. The semiconductor system of claim 4, wherein the main string region and the flag string region include a plurality of strings, which is substantially equally configured to each other.

6. The semiconductor system of claim 5, wherein the LSB data or the MSB data is stored in the strings of the main string region, and flag data representing that the LSB data is stored in the buffer block is stored in the strings of the flag string region.

7. A method of operating a semiconductor system, comprising:

programming least significant bits (LSB) data in a buffer block;

copying the LSB data stored in the buffer block to a main block; and directly programming most significant bits (MSB) data in the main block, wherein the MSB data is not stored in the buffer block after the LSB data is stored in the buffer block, and wherein when a sudden power fail is caused in the programming of the MSB data, the LSB data stored in the buffer block is copied to the main block, and then the programming of the MSB data is performed again.

8. The method of claim 7, wherein the MSB data is programmed in the buffer block when a storage space is left in the buffer block.

9. The method of claim 7, wherein the programming of the second bits of the data in the main block includes:

determining whether to perform a garbage collection;

programming the MSB data in the buffer block, and then copying the MSB data programmed in the buffer block to the main block when it is determined not to perform the garbage collection as a result of the determining; and performing the garbage collection, and then programming the MSB data in the main block when it is determined to perform the garbage collection as a result of the determining.

10. The method of claim 9, wherein the determining whether to perform the garbage collection is performed by scanning the buffer block.

11. The method of claim 10, wherein as a result of the scanning of the buffer block, when the LSB data fill up a storage space of the buffer block, the garbage collection is performed.

12. The method of claim 9, wherein the garbage collection is performed by copying the LSB the data stored in the buffer block to the main block.

* * * * *